(12) United States Patent
Tsukada

(10) Patent No.: US 11,491,869 B2
(45) Date of Patent: Nov. 8, 2022

(54) DRIVE DEVICE

(71) Applicant: HONDA MOTOR CO., LTD., Tokyo (JP)

(72) Inventor: Yoshinari Tsukada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/400,538

(22) Filed: Aug. 12, 2021

(65) Prior Publication Data
US 2022/0048382 A1    Feb. 17, 2022

(30) Foreign Application Priority Data

Aug. 13, 2020    (JP) .............................. JP2020-136797

(51) Int. Cl.
*B60K 1/02*        (2006.01)
*F16H 3/64*        (2006.01)
*B60K 17/08*       (2006.01)

(52) U.S. Cl.
CPC ................ *B60K 17/08* (2013.01); *B60K 1/02* (2013.01); *F16H 3/64* (2013.01);
(Continued)

(58) Field of Classification Search
CPC ..... B60K 1/02; F16H 2200/2066–2092; F16H 2200/2033–2061;
(Continued)

(56) References Cited

U.S. PATENT DOCUMENTS

2007/0010364 A1*  1/2007  Bucknor ................ B60K 6/445
                                                    475/5
2007/0032327 A1*  2/2007  Raghavan .............. B60K 6/445
                                                    475/284
(Continued)

FOREIGN PATENT DOCUMENTS

JP          5466201 B2    4/2014

OTHER PUBLICATIONS

May 10, 2022, Japanese Office Action issued for related JP Application No. 2020-136797.

*Primary Examiner* — David R Morris
*Assistant Examiner* — Lillian T Nguyen
(74) *Attorney, Agent, or Firm* — Paratus Law Group, PLLC

(57) ABSTRACT

A first electric motor is coupled to a first rotating element of a first differential mechanism, and a second electric motor is coupled to a first rotating element of a second differential mechanism. A first rotating element coupling body, formed by coupling a second rotating element of the first differential mechanism and a second rotating element of the second differential mechanism with each other, is coupled to an output shaft. a second rotating element coupling body, formed by coupling a third rotating element of the first differential mechanism and a third rotating element of the second differential mechanism with each other, is coupled to a first connection/disconnection portion. A first rotating element of the first differential mechanism, the first rotating element coupling body, the second rotating element coupling body, a first rotating element of the second differential mechanism are aligned in this order on a collinear diagram.

4 Claims, 19 Drawing Sheets

(52) U.S. Cl.
CPC ............. *F16H 2200/0039* (2013.01); *F16H 2200/2007* (2013.01); *F16H 2200/2043* (2013.01)

(58) Field of Classification Search
CPC .................. F16H 2200/2007–2017; F16H 2200/0021–0026
See application file for complete search history.

(56) References Cited

U.S. PATENT DOCUMENTS

| | | | |
|---|---|---|---|
| 2007/0072725 A1* | 3/2007 | Bucknor | B60K 6/365 475/5 |
| 2007/0105678 A1* | 5/2007 | Bucknor | B60K 6/445 475/5 |
| 2007/0129196 A1* | 6/2007 | Bucknor | B60K 6/40 475/5 |
| 2007/0129202 A1* | 6/2007 | Raghavan | B60K 6/445 475/275 |
| 2007/0129204 A1* | 6/2007 | Bucknor | B60K 6/445 475/275 |
| 2007/0197335 A1* | 8/2007 | Raghavan | B60K 6/40 475/5 |
| 2007/0219036 A1* | 9/2007 | Bucknor | B60K 6/445 475/5 |
| 2007/0270262 A1* | 11/2007 | Raghavan | F16H 3/728 475/5 |
| 2007/0275807 A1* | 11/2007 | Bucknor | B60K 6/547 475/5 |
| 2007/0275813 A1* | 11/2007 | Raghavan | F16H 3/663 475/275 |
| 2007/0275814 A1* | 11/2007 | Bucknor | B60K 6/547 475/275 |
| 2008/0045365 A1* | 2/2008 | Usoro | B60K 6/365 475/5 |
| 2008/0248909 A1* | 10/2008 | Raghavan | F16H 3/728 475/5 |
| 2009/0093332 A1* | 4/2009 | Bucknor | B60K 6/40 475/5 |
| 2009/0176610 A1* | 7/2009 | Conlon | B60W 10/08 475/5 |
| 2010/0137091 A1* | 6/2010 | Park | F16H 3/728 475/5 |
| 2013/0006460 A1 | 1/2013 | Endo et al. | |
| 2018/0297463 A1 | 10/2018 | Hwang et al. | |

* cited by examiner

FIG. 4

| OPERATION MODE | MG1 | MG2 | TWC1 | TWC2 | TWC3 | B1 | B2 |
|---|---|---|---|---|---|---|---|
| I | ○ | ○ | Lock | Lock | Free | — | — |
| II | ○ | ○ | Free | Lock | Free | — | — |
| III | ○ | — | Free | Free | Lock | — | — |
| Rev. | ○ | — | Free | Lock | Free | — | ○ |
| LIMP HOME A | ○ | FAILURE | Free | Lock | Free | — | ○ |
| LIMP HOME B | FAILURE | ○ | Free | Lock | Free | ○ | — |
| LIMP HOME A Rev. | ○ | FAILURE | Free | Lock | Free | — | ○ |
| LIMP HOME B Rev. | FAILURE | ○ | Free | Lock | Free | ○ | — |

○ : INDICATE OPERATION STATE OR ACTUATED STATE
— : INDICATE STOPPED STATE OR OPEN STATE
Lock/Free : INDICATE STATE INCLUDING CONTROL

[OPERATION MODE II · INITIAL STAGE]

[OPERATION MODE II → OPERATION MODE III]

[OPERATION MODE II → OPERATION MODE III]

[OPERATION MODE III]

[OPERATION MODE III REGENERATE]

[OPERATION MODE Rev.]

[OPERATION MODE LIMP HOME B]

[OPERATION MODE LIMP HOME B_Rev.]

DRIVE DEVICE

CROSS REFERENCE TO RELATED APPLICATIONS

This application claims priority to Japanese Patent Application No. 2020-136797 filed on Aug. 13, 2020, the content of which is incorporated herein by reference.

TECHNICAL FIELD

The present invention relates to a drive device provided in an electric vehicle or the like.

BACKGROUND ART

There has been a drive device that includes a first electric motor, a second electric motor, a differential mechanism, and an output shaft, combines outputs of the first electric motor and the second electric motor by the differential mechanism, and transmits the outputs to the output shaft (for example, see JP 5466201 B).

However, in the drive device of Patent Literature 1, since the first electric motor and the second electric motor are directly connected to one differential mechanism, control regions (a rotation direction and a rotation speed) of the first electric motor and the second electric motor are limited. Therefore, it is difficult to improve an acceleration performance at the time of starting or towing a vehicle, and there is also a concern that differential rotation of the differential mechanism increases as the rotational speed of the output shaft increases, and the mechanical loss increases.

An aspect of the present invention provides a drive device capable of improving an acceleration performance at the time of starting or towing a vehicle.

SUMMARY OF INVENTION

According to an aspect of the present invention, there is provided a drive device that includes: a first electric motor; a second electric motor; a first differential mechanism capable of differentiating three rotating elements from each other; a second differential mechanism capable of differentiating three rotating elements from each other; an output shaft; and a first connection/disconnection portion configured to allow rotation in a disengaged state and restrict rotation in an engaged state. The first electric motor is coupled to a first rotating element of the first differential mechanism. The second electric motor is coupled to a first rotating element of the second differential mechanism. A second rotating element of the first differential mechanism and a second rotating element of the second differential mechanism are coupled with each other to form a first rotating element coupling body, and the first rotating element coupling body is coupled to the output shaft. A third rotating element of the first differential mechanism and a third rotating element of the second differential mechanism are coupled with each other to form a second rotating element coupling body, and the second rotating element coupling body is coupled to the first connection/disconnection portion. The first rotating element of the first differential mechanism, the first rotating element coupling body, the second rotating element coupling body, the first rotating element of the second differential mechanism are aligned in this order on a collinear diagram.

BRIEF DESCRIPTION OF DRAWINGS

FIG. 4 is an actuating table illustrating a actuating pattern of the drive device in FIG. 1.

DESCRIPTION OF EMBODIMENTS

Hereinafter, an embodiment of a drive device of the present invention will be described with reference to the accompanying drawings.

Figure 1:
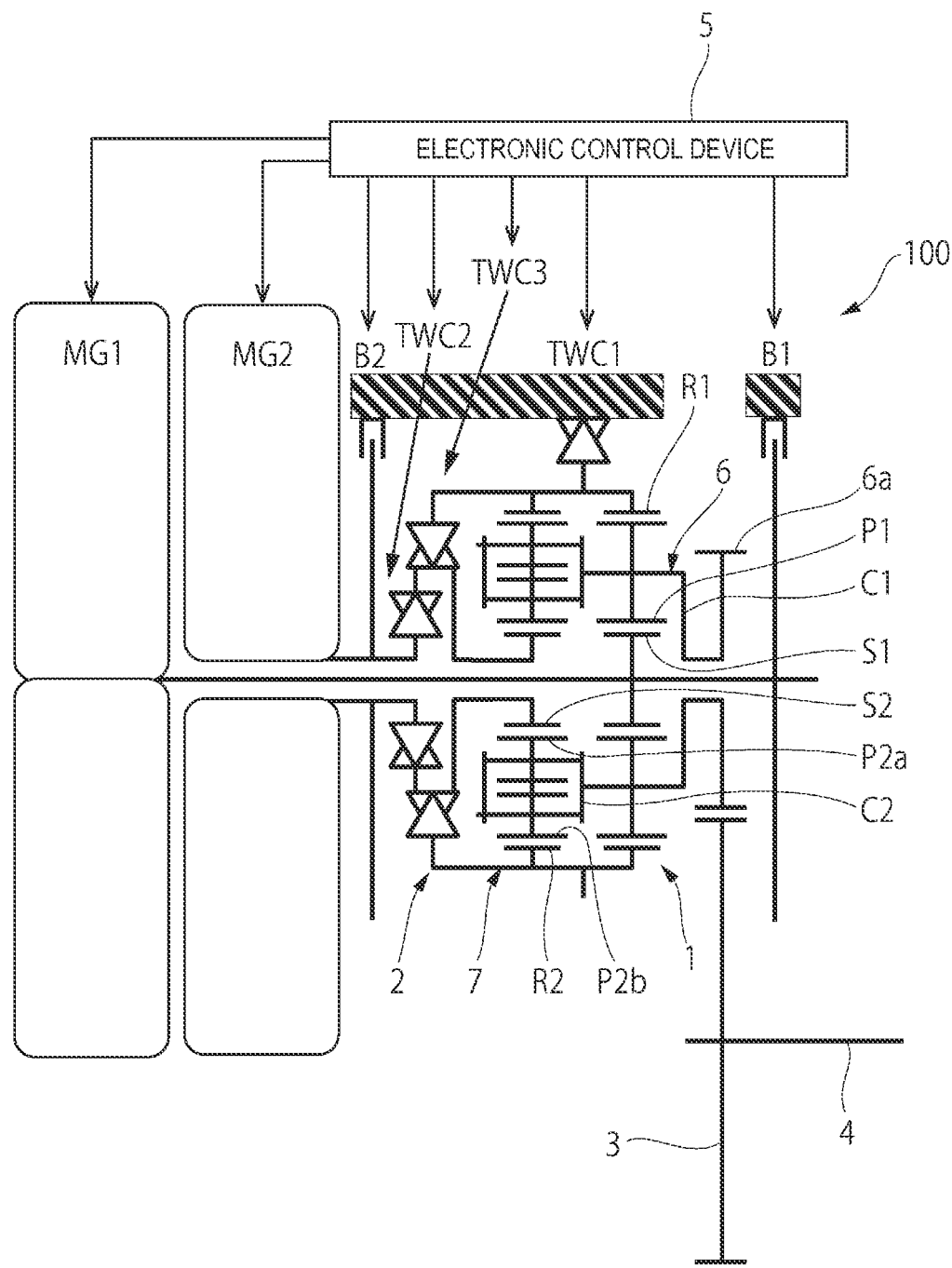
FIG. 1 is a skeleton diagram illustrating a drive device according to an embodiment of the present invention.

A drive device 100 according to an embodiment of the present invention as illustrated in FIG. 1 includes a first motor generator MG1 and a second motor generator MG2 functioning as an electric motor and a generator, respectively, a first differential mechanism 1 capable of differentiating three rotating elements from each other, a second differential mechanism 2 capable of differentiating the three rotating elements from each other, an output shaft 4 outputting power of the first motor generator MG1 and the second motor generator MG2 via the first differential mechanism 1, the second differential mechanism 2, and a counter gear 3, first to third clutches TWC1 to TWC3, first and second brakes B1, B2, a first motor generator MG1, a second motor generator MG2, and an electronic control device 5 controlling the first to third clutches TWC1 to TWC3 and the first and second brakes B1, B2.

The first differential mechanism 1 is a single pinion type planetary gear mechanism, and includes a sun gear S1, a ring gear R1 provided concentrically with the sun gear S1, a plurality of pinion gears P1 meshing with the sun gear S1 and the ring gear R1, and a carrier C1 rotatably and revolvably supporting the plurality of pinion gears P1.

The second differential mechanism 2 is a double pinion type planetary gear mechanism, and includes a sun gear S2, a ring gear R2 provided concentrically with the sun gear S2, a plurality of inner pinions P2a meshing with the sun gear S2, a plurality of outer pinions P2b meshing with the inner pinion P2a and the ring gear R2, and a carrier C2 rotatably and revolvably supporting the plurality of inner pinions P2a and the plurality of outer pinions P2b.

The sun gear S1 of the first differential mechanism 1 is coupled to a motor shaft of the first motor generator MG1, and the sun gear S2 of the second differential mechanism 2 is coupled to a motor shaft of the second motor generator MG2. Further, the carrier C1 of the first differential mechanism 1 and the carrier C2 of the second differential mechanism 2 are coupled to each other to form a carrier coupling body 6, and the ring gear R1 of the first differential mechanism 1 and the ring gear R2 of the second differential mechanism 2 are coupled to each other to form a ring gear coupling body 7. The carrier coupling body 6 includes an integrally rotatable output gear 6a, and is coupled to the output shaft 4 via the output gear 6a and the counter gear 3.

Each of the first clutch TWC1, the second brake B2, and the first brake B1 is a connection/disconnection portion that allows rotation in a disengaged state and restricts rotation in an engaged state. The first clutch TWC1 is, for example, a two-way clutch, is coupled to the ring gear coupling body 7, allows rotation of the ring gear coupling body 7 in the disengaged state, and restricts the rotation of the ring gear coupling body 7 in the engaged state. The second brake B2 is, for example, a brake mechanism, is coupled to the motor shaft of the second motor generator MG2 or the sun gear S2 of the second differential mechanism 2, allows rotation of the second motor generator MG2 in the disengaged state, and restricts the rotation of the second motor generator MG2 in the engaged state. The first brake B1 is, for example, a hydraulic brake, and is coupled to the motor shaft of the first motor generator MG1 or the sun gear S1 of the first differential mechanism 1, allows rotation of the first motor generator MG1 in the disengaged state, and restricts the rotation of the first motor generator MG1 in the engaged state.

The second clutch TWC2 is a connection/disconnection portion that cuts off power transmission in the disengaged state and allows the power transmission in the engaged state. The second clutch TWC2 is, for example, a two-way clutch, is interposed between the motor shaft of the second motor generator MG2 and the sun gear S2 of the second differential mechanism 2, cuts off power transmission between the second motor generator MG2 and the sun gear S2 of the second differential mechanism 2 in the disengaged state, and allows the power transmission between the second motor generator MG2 and the sun gear S2 of the second differential mechanism 2 in the engaged state. The third clutch TWC3 allows differential rotation of the three rotating elements of the second differential mechanism 2 in the disengaged state, and disables differential rotation of the three rotating elements of the second differential mechanism 2 in the engaged state. The third clutch TWC3 is, for example, a two-way clutch, is interposed between the sun gear S2 of the second differential mechanism 2 and the ring gear coupling body 7, allows the differential rotation of the three rotating elements of the second differential mechanism 2 in the disengaged state, and disables the differential rotation of the three rotating elements of the second differential mechanism 2 in the engaged state. When the differential rotation of the three rotating elements of the second differential mechanism 2 is disabled in the engaged state of the third clutch TWC3, the differential rotation of the three rotating elements of the first differential mechanism 1 is also disabled. Therefore, the third clutch TWC3 allows differential rotation of the respective three rotating elements of the first differential mechanism 1 and the second differential mechanism 2 in the disengaged state, and disables differential rotation of the respective three rotating elements of the first differential mechanism 1 and the second differential mechanism 2 in the engaged state.

Figure 2:
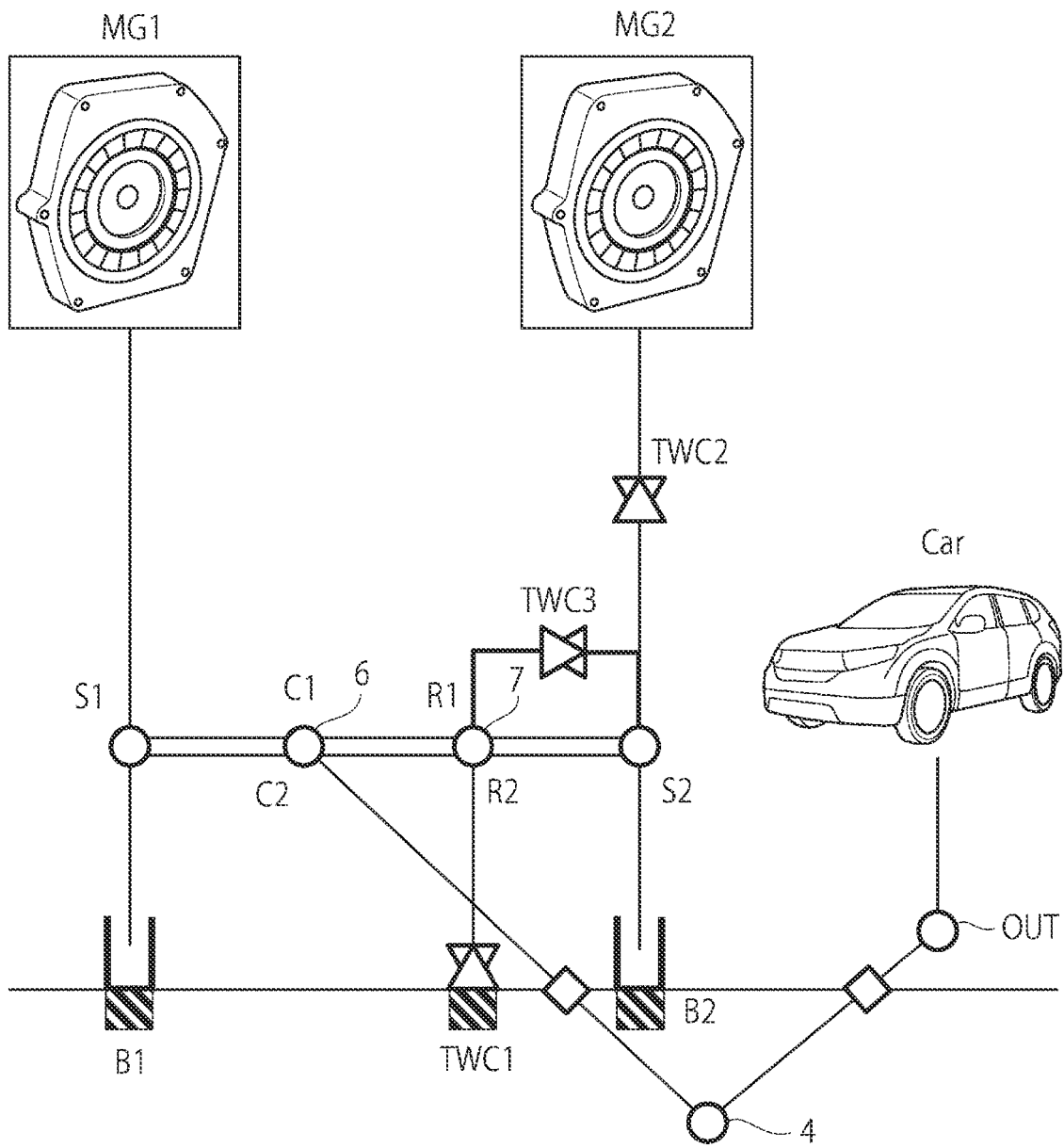
FIG. 2 is a schematic diagram illustrating a coupling relationship of rotating elements of the drive device in FIG. 1.

FIG. 2 is a schematic diagram illustrating a coupling relationship of the rotating elements of the drive device 100 in FIG. 1. As illustrated in FIG. 2, the output shaft 4 of the drive device 100 is coupled to an axle OUT via a gear pair (not illustrated).

FIGS. 7 to 19 are collinear diagrams of the drive device 100 illustrating a relationship between rotational speeds of the sun gear S1 of the first differential mechanism 1, the carrier coupling body 6 (the carrier C1 of the first differential mechanism 1 and the carrier C2 of the second differential mechanism 2), the ring gear coupling body 7 (the ring gear R1 of the first differential mechanism 1 and the ring gear R2 of the second differential mechanism 2), and the sun gear S2 of the second differential mechanism 2.

In the present specification, the collinear diagrams each illustrate a relationship between rotation speeds of the respective rotating elements, and include a vertical axis indicating the rotation speed of each rotating element and a horizontal axis indicating a value of the rotation speed of 0, and an interval between the respective rotating elements on the horizontal axis indicates a gear ratio between the respective rotating elements. The vertical axis indicates rotation in a forward rotation direction at an upper side of the horizontal axis (rotation speed 0), and indicates rotation in a reverse rotation direction at a lower side of the horizontal axis. The collinear relationship means that the rotational speeds of the respective rotating elements are aligned on a single straight line. When the carrier coupling body 6 (the carrier C1 of the first differential mechanism 1 and the carrier C2 of the second differential mechanism 2) rotates in the forward rotation direction, the axle OUT of a vehicle Car on which the drive device 100 is mounted rotates in a forward direction, and when the carrier coupling body 6 (the carrier C1 of the first differential mechanism 1 and the carrier C2 of the second differential mechanism 2) rotates in the reverse rotation direction, the axle OUT of the vehicle Car on which the drive device 100 is mounted rotates in a backward direction. In the drawings, "α", "1", and "β" illustrated in an upper portion indicate gear ratios between the respective elements, and the first motor generator MG1, the axle OUT, the first clutch TWC1, and the second motor generator MG2 illustrated in a lower portion indicate rotating elements coupled to the sun gear S1, the carrier coupling body 6, the ring gear coupling body 7, and the sun gear S2, respectively.

As illustrated in FIGS. 7 to 19, the drive device 100 is configured by aligning the sun gear S1 of the first differential mechanism 1, the carrier coupling body 6 (the carrier C1 of the first differential mechanism 1 and the carrier C2 of the second differential mechanism 2), the ring gear coupling body 7 (the ring gear R1 of the first differential mechanism 1 and the ring gear R2 of the second differential mechanism 2), and the sun gear S2 of the second differential mechanism 2 in this order on the collinear diagrams. Since the first differential mechanism 1 is a single pinion type planetary gear mechanism, the sun gear S1, the carrier C1 (the carrier coupling body 6), and the ring gear R1 (the ring gear coupling body 7) of the first differential mechanism 1 are arranged in this order. On the other hand, since the second differential mechanism 2 is a double pinion type planetary gear mechanism, the sun gear S2, the carrier C2 (the carrier coupling body 6), and the ring gear R2 (the ring gear coupling body 7) of the second differential mechanism 2 are arranged on the collinear diagrams in a way that the order of the carrier C2 (the carrier coupling body 6) and the ring gear R2 (the ring gear coupling body 7) is reversed.

Figure 3:
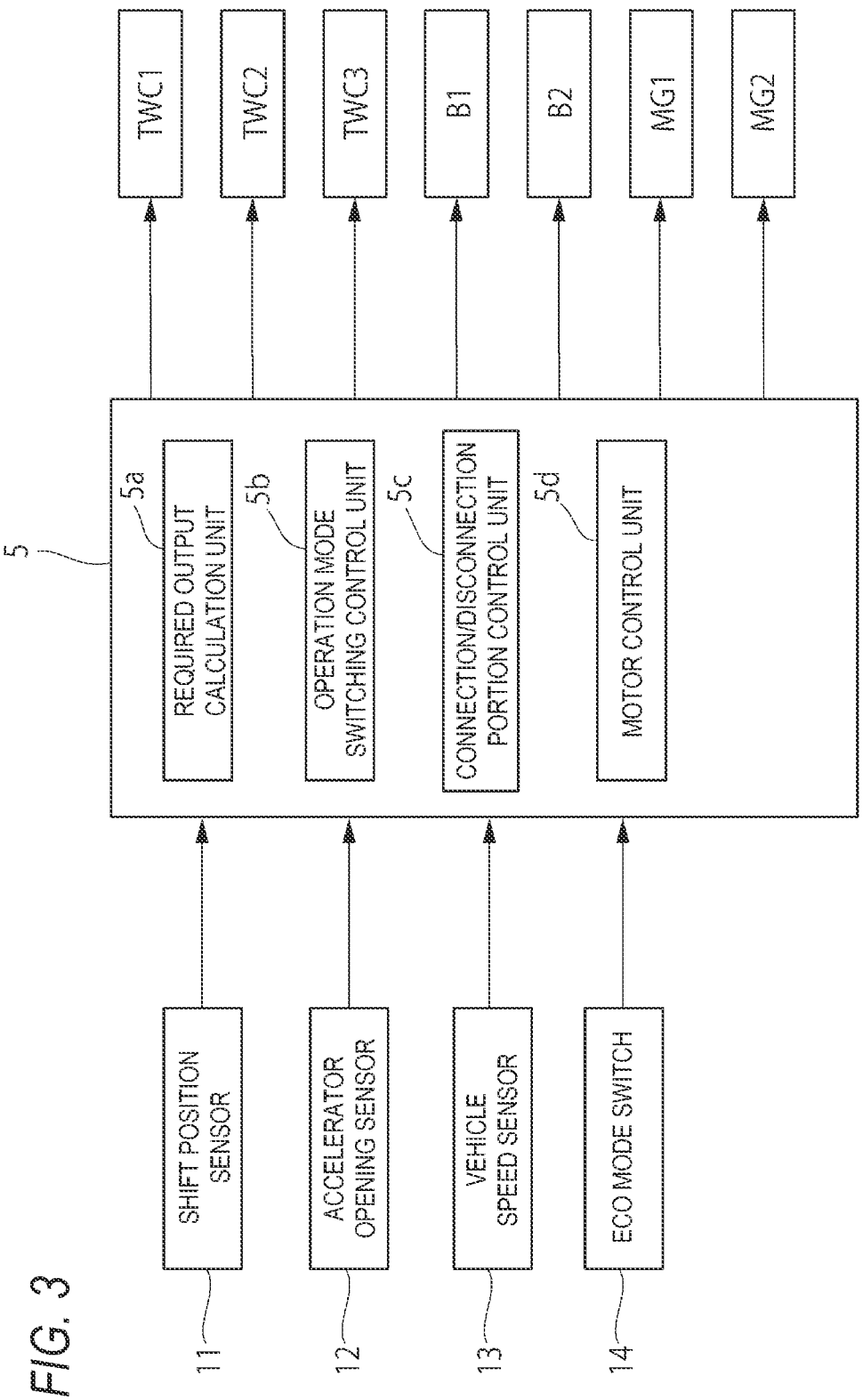
FIG. 3 is a block diagram illustrating a control configuration of the drive device in FIG. 1.

As illustrated in FIG. 3, a shift position sensor 11 that detects a shift position of a transmission, an accelerator opening sensor 12 that detects an opening of an accelerator, a vehicle speed sensor 13 that detects a vehicle speed, and an ECO mode switch 14 that sets ON/OFF of an ECO operation mode in which one-motor driving (an operation mode III) is prioritized are coupled to an input side of the electronic control device 5, and the first to third clutches TWC1 to TWC3, the first and second brakes B1, B2, the first motor generator MG1, and the second motor generator MG2 described above are coupled to an output side of the electronic control device 5.

The electronic control device 5 includes a required output calculation unit 5a, an operation mode switching control unit 5b, a connection/disconnection portion control unit 5c, and a motor control unit 5d as functional configurations implemented by cooperation of hardware and software.

The required output calculation unit 5a calculates a required output based on sensor signals of the shift position sensor 11, the accelerator opening sensor 12, and the vehicle speed sensor 13. The operation mode switching control unit 5b switches an operation mode based on the required output and a switch signal of the ECO mode switch 14. The connection/disconnection portion control unit 5c controls the first to third clutches TWC1 to TWC3 and the first and second brakes B1, B2 according to the operation mode. The motor control unit 5d controls the first motor generator MG1 and the second motor generator MG2 according to the required output and the operation mode.

As illustrated in FIG. 4, the electronic control device 5 realizes a plurality of operation modes by actuating the first to third clutches TWC1 to TWC3, the first and second brakes B1, B2, the first motor generator MG1, and the second motor generator MG2 in a predetermined pattern. The plurality of operation modes include a two-motor driven operation mode I that is applied when towing or starting a vehicle that requires high torque, a two-motor driven operation mode II that is mainly applied in a low speed range, the one-motor driven operation mode III that is mainly applied in a medium speed range or higher, the one-motor driven operation mode Rev. that is applied when the vehicle moves backward, a one-motor driven operation mode limp home A that is applied when a failure occurs in the second motor generator MG2, a one-motor driven operation mode limp home B that is applied when a failure occurs in the first motor generator MG1, a one-motor driven operation mode limp home A_Rev. that is applied when the vehicle moves backward when a failure occurs in the second motor generator MG2, and a one-motor driven operation mode limp home B_Rev. that is applied when the vehicle moves backward when a failure occurs in the first motor generator MG1.

Figure 5:
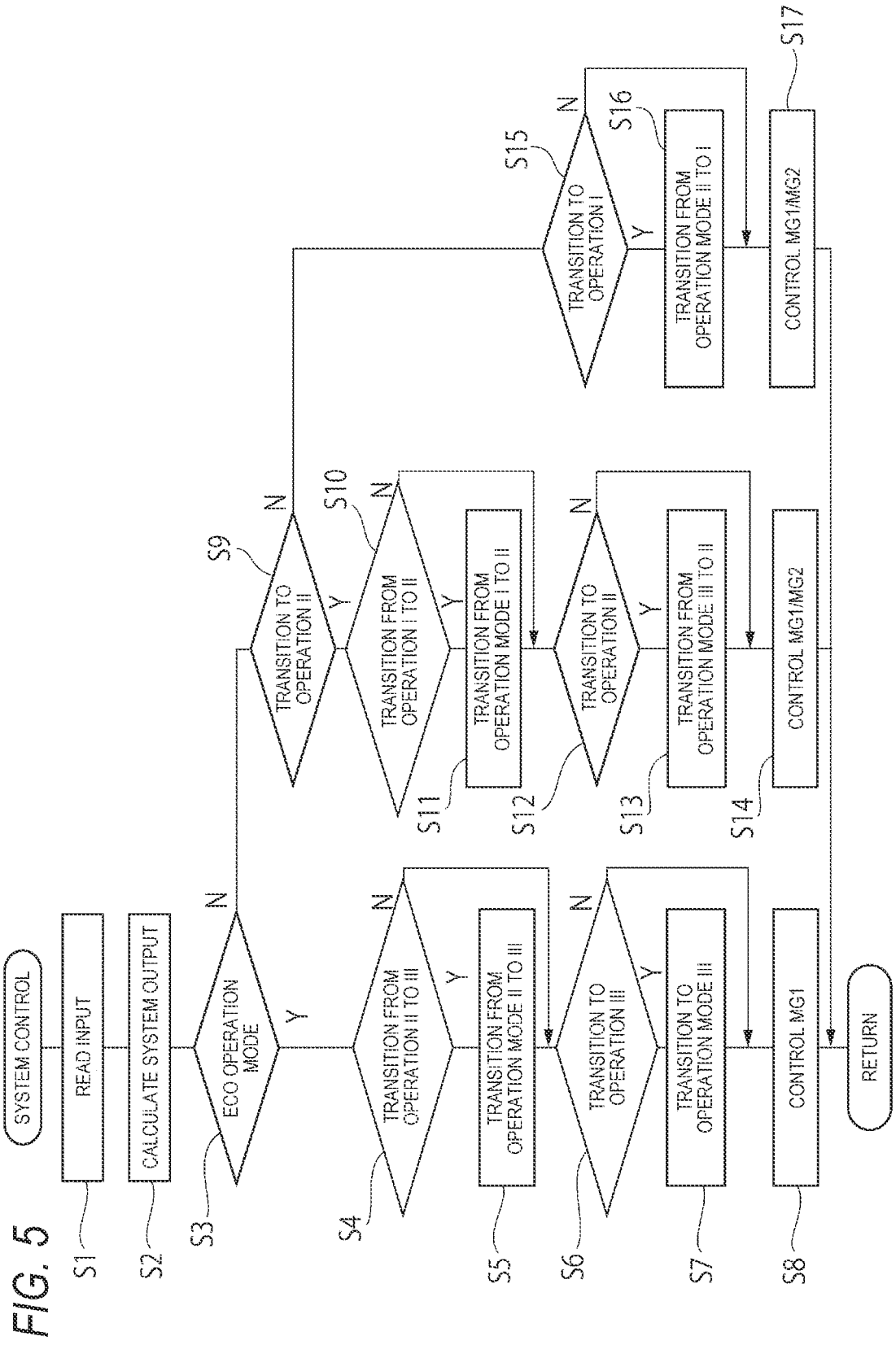
FIG. 5 is a flowchart illustrating a control example of the drive device in FIG. 1.

As illustrated in FIG. 5, the electronic control device 5 reads various sensor signals and switch signals (S1), and calculates a required output and an operation mode to be applied (S2). Thereafter, the electronic control device 5 determines whether the current operation mode is the ECO operation mode (S3), when the determination result is YES, the electronic control device 5 determines whether a transition from the operation mode II to the operation mode III has occurred (S4) or whether a transition from an operation mode other than the operation mode II to the operation mode III has occurred (S6), and when either of the two determination results is YES, the electronic control device controls the connection/disconnection portion in a preset transition actuating pattern, and executes the transition to the operation mode III (S5, S7). Then, in the operation mode III, the electronic control device 5 stops the second motor generator MG2, and controls driving of only the first motor generator MG1 according to the required output (S8).

When the determination result of step S3 is NO, the electronic control device 5 determines whether a transition to the operation mode II has occurred (S9), when the determination result is YES, the electronic control device 5 determines whether a transition from the operation mode I to the operation mode II has occurred (S10) or whether a transition from the operation mode III to the operation mode II has occurred (S12), and when either of the two determination results is YES, the electronic control device 5 controls the connection/disconnection portion in a preset transition actuating pattern, and executes the transition to the operation mode II (S11, S13). Then, in the operation mode II, the electronic control device 5 controls driving of the first motor generator MG1 and the second motor generator MG2 according to the required output (S14).

When the determination result of step S9 is NO, the electronic control device 5 determines whether a transition to the operation mode I has occurred (S15), and when the determination result is YES, the electronic control device 5 controls the connection/disconnection portion in a preset transition actuating pattern, and executes the transition to the operation mode I (S16). Then, in the operation mode I, the electronic control device 5 controls the driving of the first motor generator MG1 and the second motor generator MG2 according to the required output (S17).

Next, specific switching methods and characteristics of the various operation modes will be described with reference to the collinear diagrams illustrated in FIGS. 7 to 19. In FIGS. 7 to 19, the engaged state of the first to third clutches TWC1 to TWC3 is indicated by "Lock", and the disengaged state of the first to third clutches TWC1 to TWC3 is indicated by "Free". The disengaged state ("Free") of the first to third clutches TWC1 to TWC3 includes a state in which the first to third clutches TWC1 to TWC3 are controlled to the disengaged state by the electronic control device 5.

Figure 7:
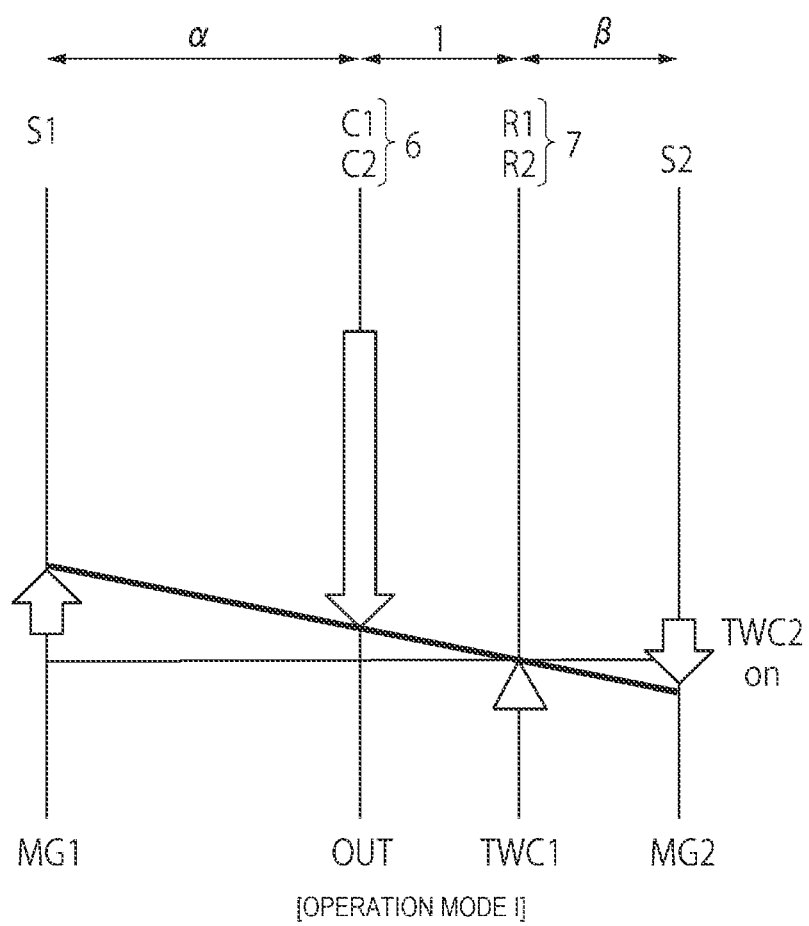
FIG. 7 is a collinear diagram illustrating the operation mode I of the drive device in FIG. 1.

FIG. 7 is the collinear diagram illustrating the operation mode I of the drive device 100. In the operation mode I, the first motor generator MG1 is driven in the forward rotation direction, the second motor generator MG2 is driven in the reverse rotation direction, the first clutch TWC1 and the second clutch TWC2 are in the engaged state, and the third clutch TWC3, the first brake B1, and the second brake B2 are in the disengaged state.

In the operation mode I, when the first motor generator MG1 is driven in the forward rotation direction and the second motor generator MG2 is driven in the reverse rotation direction, since the first clutch TWC1 is in the engaged state and the ring gear coupling body 7 is fixed, the carrier coupling body 6 rotates forward, and rotational power in the forward direction is output from the axle OUT. At this time, torque T output from the output shaft 4 is expressed by the following equation. α, β, and 1 are the gear ratios between the rotating elements, Tmg1 is output torque of the first motor generator MG1, and Tmg2 is output torque of the second motor generator MG2.

$$T=(\alpha+1)\times Tmg1+\beta\times Tmg2$$

Figure 6A:
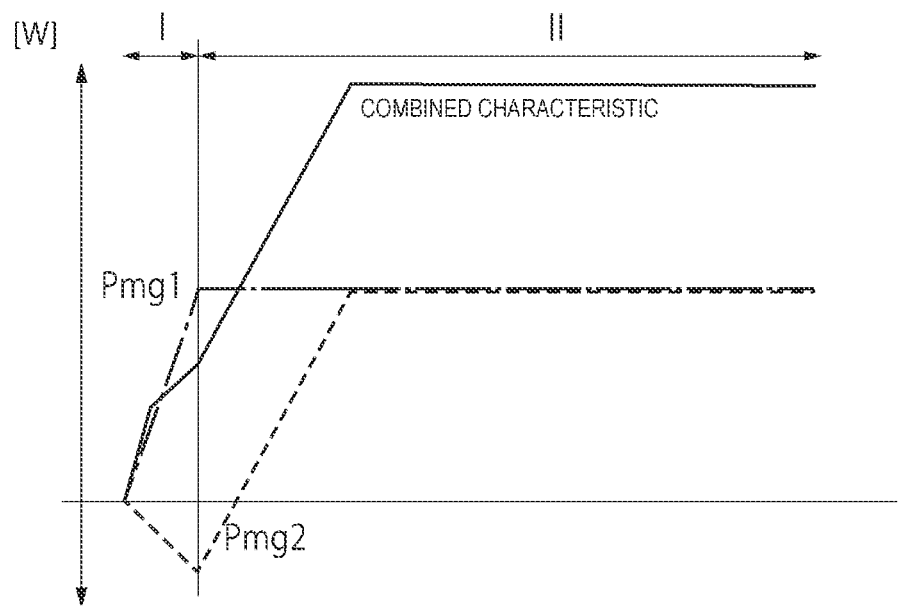
FIG. 6A is a graph illustrating an output of a first motor generator, an output of a second motor generator, and a combined output of the first motor generator and the second motor generator in an operation mode I and an operation mode II.
Figure 6B:
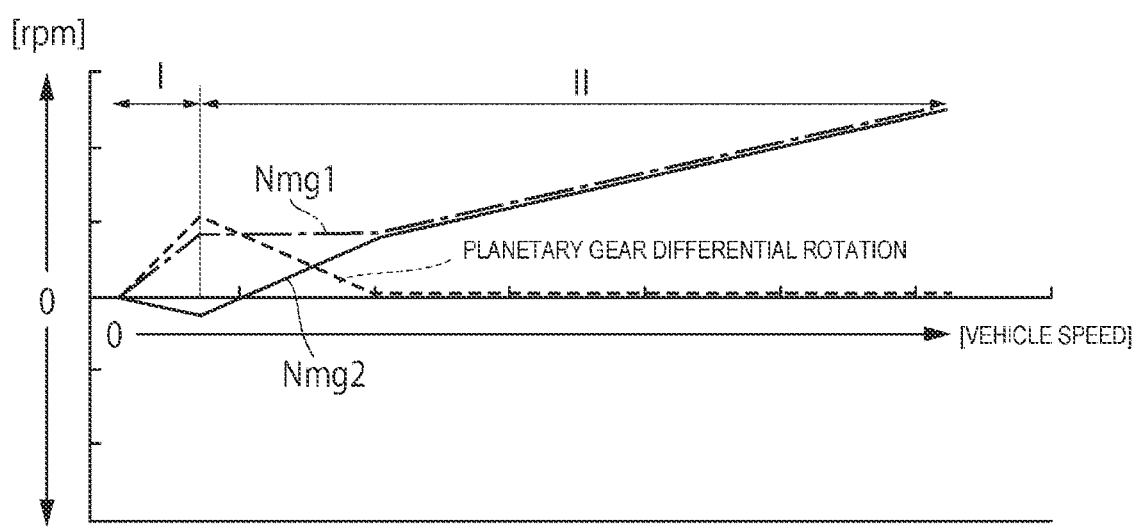
FIG. 6B is a graph illustrating a rotation speed of the first motor generator, a rotation speed of the second motor generator, and a differential rotation between the first differential mechanism and the second differential mechanism in the operation mode I and the operation mode II.

In a region I of FIG. 6A, an output of the first motor generator MG1, an output of the second motor generator MG2, and a combined output of the first motor generator MG1 and the second motor generator MG2 in the operation mode I are illustrated, and in a region I of FIG. 6B, a rotation speed of the first motor generator MG1, a rotation speed of the second motor generator MG2, and a differential rotation in the first differential mechanism 1 and the second differential mechanism 2 in the operation mode I are illustrated. In this way, according to the operation mode I, it is possible to improve the acceleration characteristic at the time of starting or towing the vehicle Car by utilizing a low speed rotation region (a high torque region) of the two electric motors, that is, the first motor generator MG1 and the second motor generator MG2.

Figure 8:
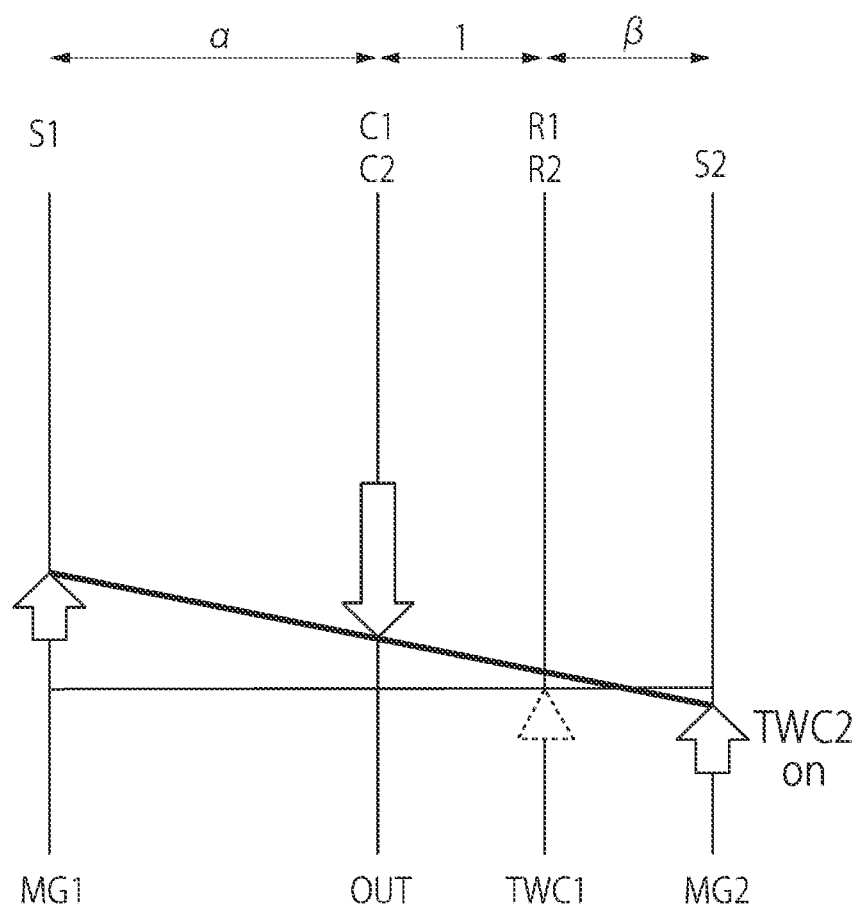
FIG. 8 is a collinear diagram illustrating an initial stage of the operation mode II of the drive device in FIG. 1.

FIG. 8 is the collinear diagram illustrating an initial stage of the operation mode II of the drive device 100, and when the drive device 100 is changed from the operation mode I in FIG. 7 to the operation mode II, the electronic control device 5 drives the second motor generator MG2 rotating in the reverse rotation direction in a direction (a forward rotation direction side) in which the second motor generator MG2 is stopped. Accordingly, the first clutch TWC1 is brought into the disengaged state from the engaged state, and the rotation of the ring gear coupling body 7 is allowed.

In this state, since the rotation of the ring gear coupling body 7 is allowed, when the first motor generator MG1 is driven in the forward rotation direction and the second motor generator MG2 rotating in the reverse rotation direction is driven in the direction (the forward rotation direction side) in which the second motor generator MG2 is stopped, the carrier coupling body 6 rotates forward, and the rotational power in the forward direction is output from the axle OUT. At this time, the torque T output from the output shaft 4 is expressed by the following equation.

$$T=\{(1+\beta)/(\alpha+1+\beta)\}\times Tmg1+\{\alpha/(\alpha+1+\beta)\}\times Tmg2$$

Figure 9:
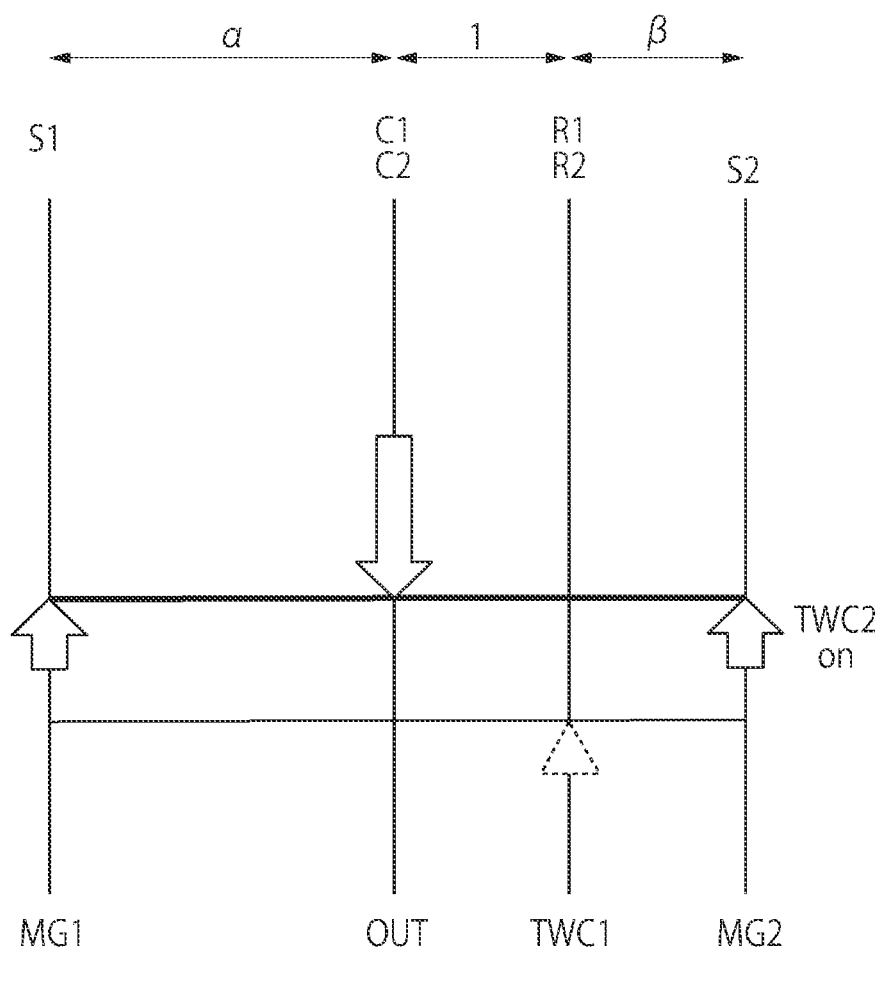
FIG. 9 is a collinear diagram illustrating a transition from the operation mode II to an operation mode III of the drive device of FIG. 1.

FIG. 9 is the collinear diagram illustrating a transition of the drive device 100 from the operation mode II to the operation mode III, and illustrates a state in which the second motor generator MG2 rotates in the forward rotation direction and has a rotational speed substantially equal to that of the first motor generator MG1.

Figure 10:
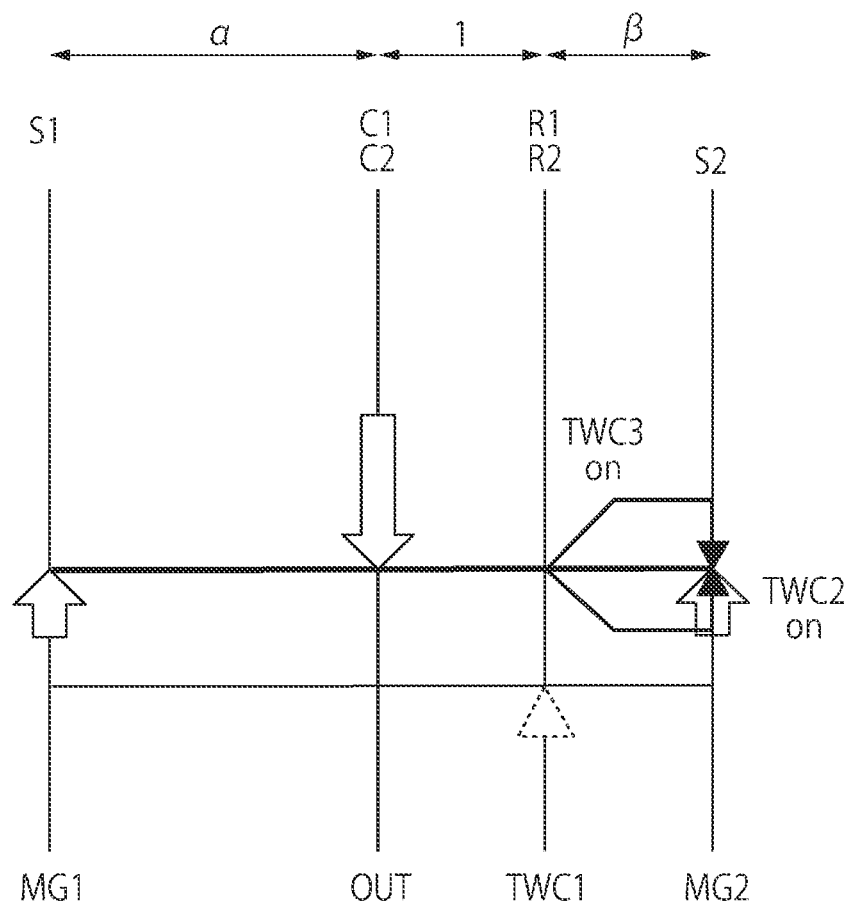
FIG. 10 is a collinear diagram illustrating the transition from the operation mode II to the operation mode III of the drive device of FIG. 1.

FIG. 10 is the collinear diagram illustrating a transition of the drive device 100 from the operation mode II to the operation mode III, and illustrates a state in which the second motor generator MG2 rotates in the forward rotation direction and has a rotational speed substantially equal to that of the first motor generator MG1, and the third clutch TWC3 is in the engaged state.

In this state, since the sun gear S2 of the second differential mechanism 2 and the ring gear coupling body 7 are fastened together, the differential rotation in the first differential mechanism 1 and the second differential mechanism 2 becomes zero. At this time, the torque T output from the output shaft 4 is expressed by the following equation.

$$T=Tmg1+Tmg2$$

A region II of FIG. 6A illustrates an output of the first motor generator MG1, an output of the second motor generator MG2, and a combined output of the first motor generator MG1 and the second motor generator MG2 in the operation mode II of FIGS. 8 to 10, and a region II of FIG. 6B illustrates a rotation speed of the first motor generator MG1, a rotation speed of the second motor generator MG2, and a differential rotation in the first differential mechanism 1 and the second differential mechanism 2 in the operation mode II of FIGS. 8 to 10. In this way, in the operation mode II, when a large driving force is required, such as when the vehicle is traveling uphill or during intermediate acceleration, a high output can be obtained using both the output of the first motor generator MG1 and the second motor generator MG2.

Figure 11:
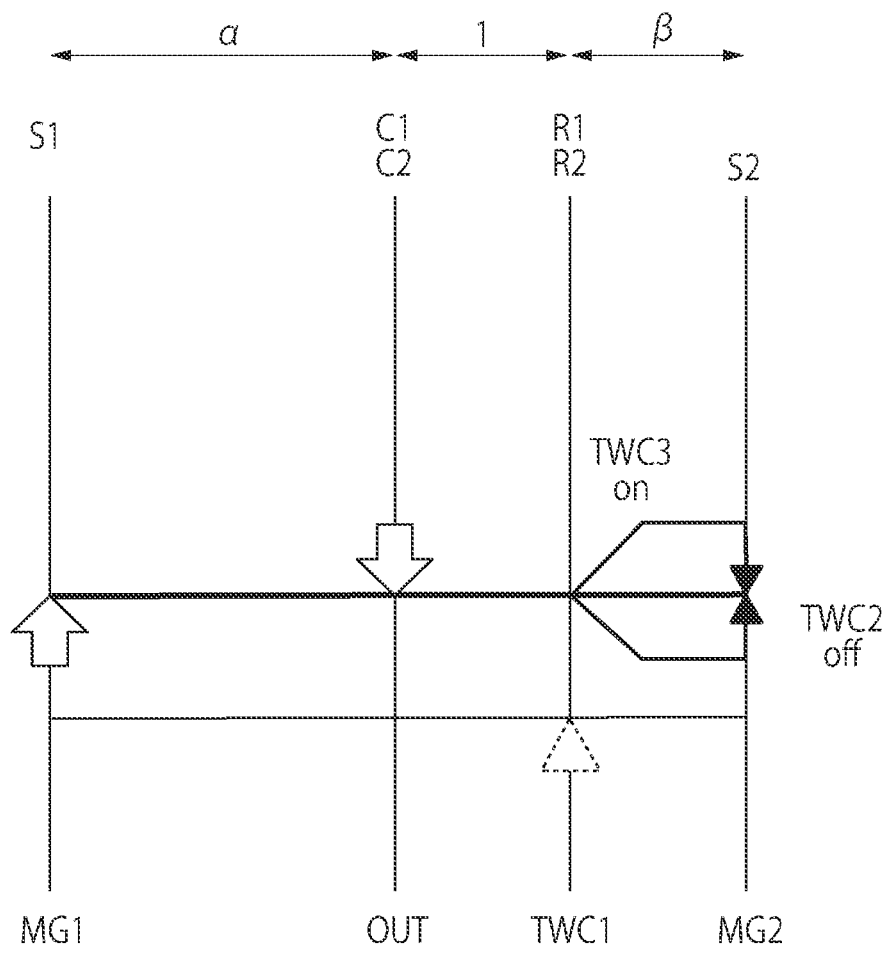
FIG. 11 is a collinear diagram illustrating the operation mode III of the drive device in FIG. 1.

FIG. 11 is the collinear diagram illustrating the operation mode III of the drive device 100, and the electronic control device 5 stops the second motor generator MG2 when the drive device 100 is set to the operation mode III. Accordingly, the second clutch TWC2 is brought into the disengaged state.

In this state, since the differential rotation of the respective rotating elements in the first differential mechanism 1 and the second differential mechanism 2 is zero, the output of the first motor generator MG1 is transmitted to the axle OUT as it is. At this time, the torque T output from the output shaft 4 is expressed by the following equation.

$$T=Tmg1$$

Figure 12:
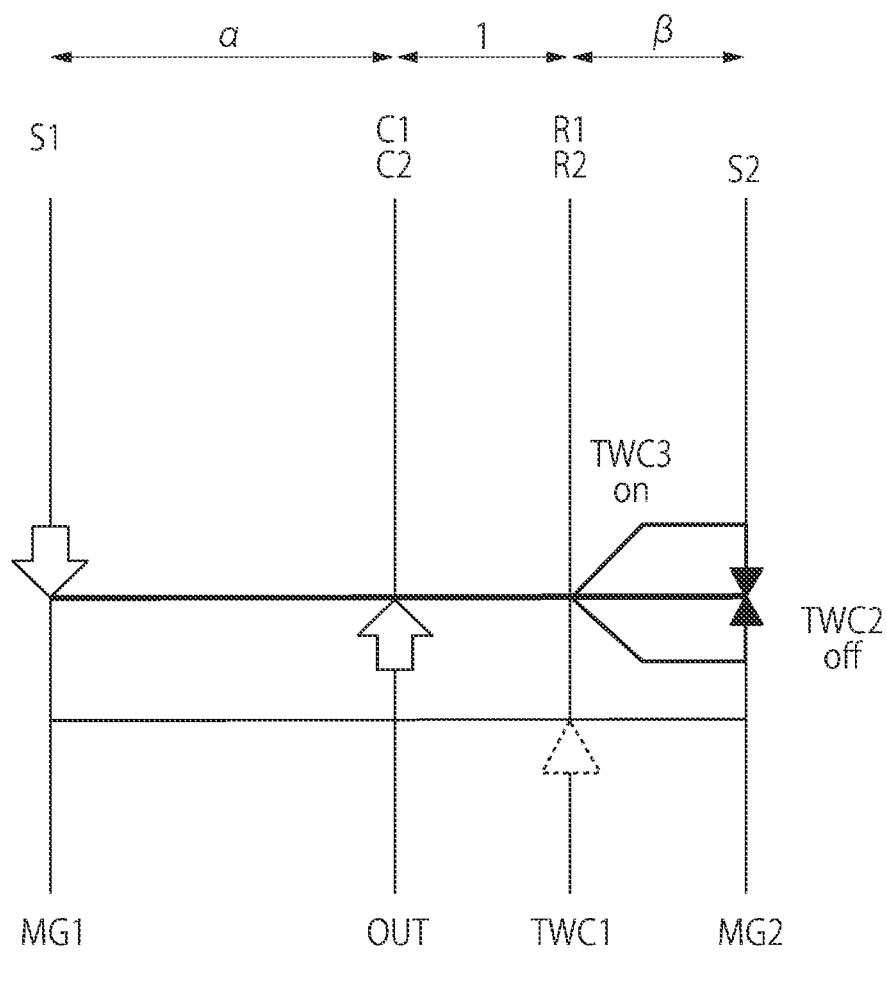
FIG. 12 is a collinear diagram illustrating a regenerative state of the operation mode III of the drive device in FIG. 1.

FIG. 12 is the collinear diagram illustrating a regenerative state of the operation mode III of the drive device 100, and in the regenerative state of the operation mode III, the first motor generator MG1 is regeneratively driven by the torque input from the axle OUT.

At this time, the torque T output from the output shaft 4 is expressed by the following equation. A negative torque T represents input torque.

$$-T=-Tmg1$$

Figure 13:
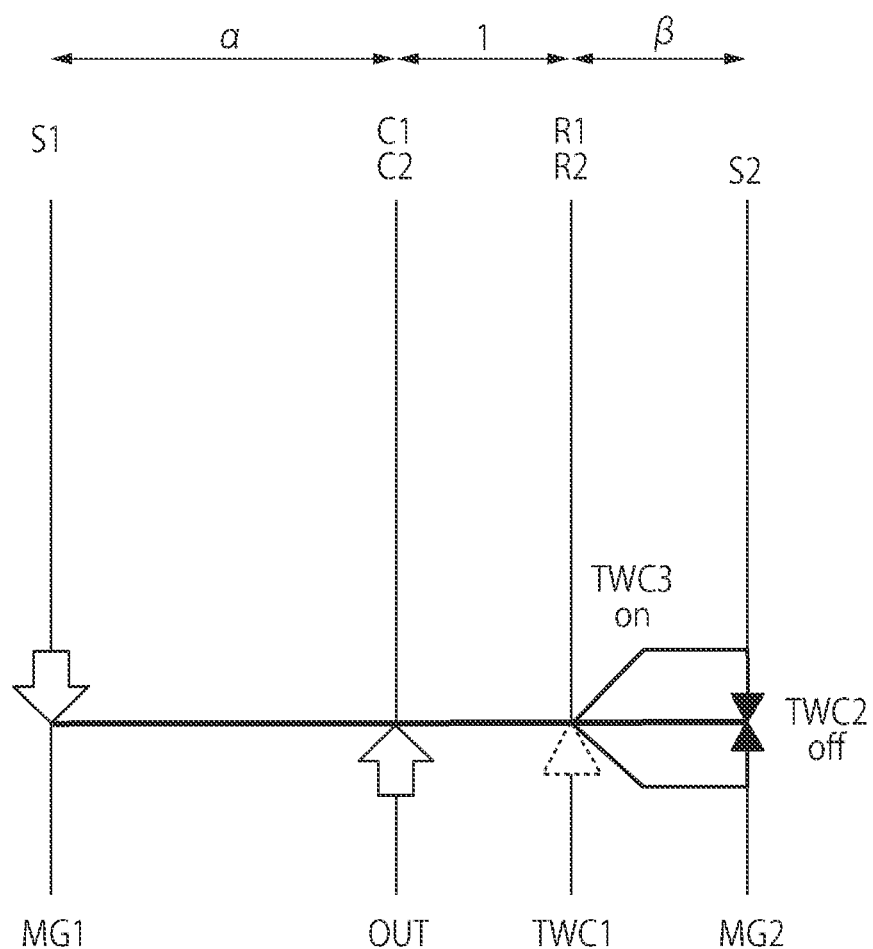
FIG. 13 is a collinear diagram illustrating a transition from the regenerative state to a stopped state of the operation mode III of the drive device in FIG. 1.

FIG. 13 is the collinear diagram illustrating a transition of the drive device 100 from the regenerative state of the operation mode III to the stopped state, and the output torque T in this state is expressed by the following equation.

$$T=Tmg1\approx 0$$

Figure 14:
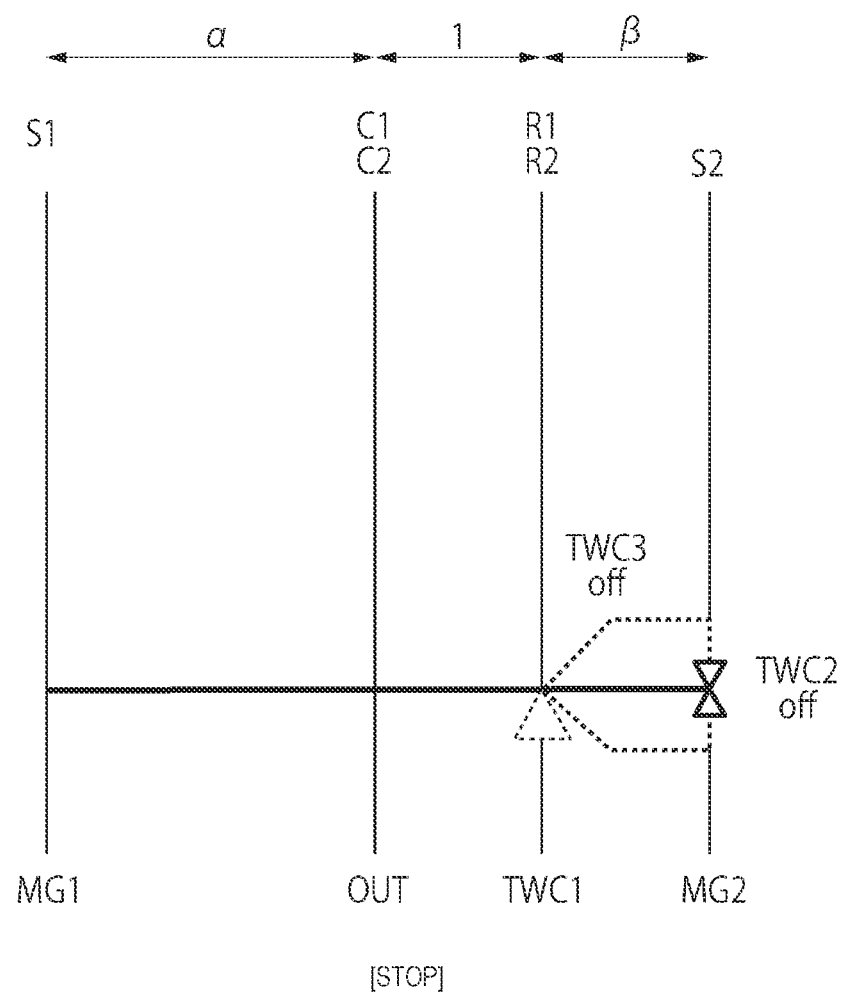
FIG. 14 is a collinear diagram illustrating the stopped state of the drive device in FIG. 1.

FIG. 14 is the collinear diagram illustrating the stopped state of the operation mode III of the drive device 100. The electronic control device 5 stops the first motor generator MG1 and the second motor generator MG2 and brings the first brake B1 and the second brake B2 into the disengaged state, so that the first to third clutches TWC1 to TWC3 are brought into the disengaged state. The output torque T in this state is expressed by the following equation.

$$T=0$$

Figure 15:
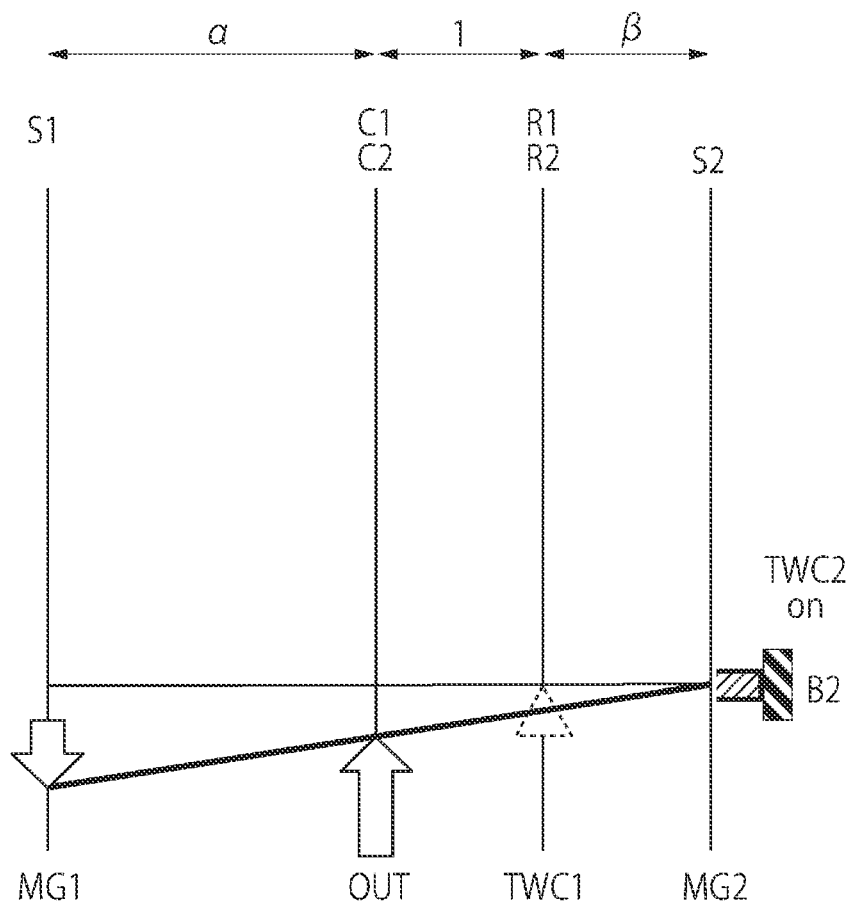
FIG. 15 is a collinear diagram illustrating an operation mode Rev. of the drive device in FIG. 1.

FIG. 15 is the collinear diagram illustrating the operation mode Rev. of the drive device 100. In the operation mode Rev., the first motor generator MG1 is driven in the reverse rotation direction, the second brake B2 is in the engaged state, and the first clutch TWC1, the third clutch TWC3, and the first brake B1 are in the disengaged state. The second clutch TWC2 is in the engaged state.

In this state, since the sun gear S2 of the second differential mechanism 2 is fixed by fastening the second brake B2, when the first motor generator MG1 is driven in the reverse rotation direction, the carrier coupling body 6 rotates reversely, and rotational power in the backward direction is output from the axle OUT. At this time, the torque T output from the output shaft 4 is expressed by the following equation.

$$T=\{(\alpha+1+\beta)/\beta\} \times Tmg1$$

Figure 16:
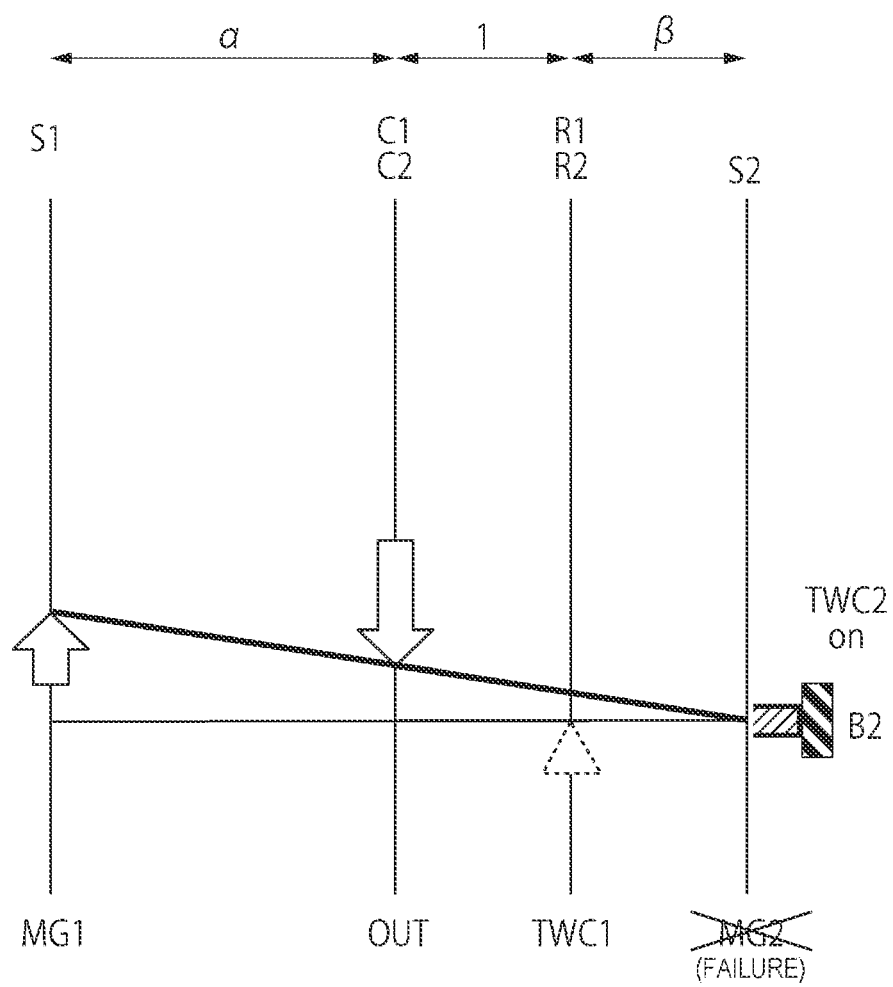
FIG. 16 is a collinear diagram illustrating an operation mode limp home A of the drive device in FIG. 1.

FIG. 16 is the collinear diagram illustrating the operation mode limp home A of the drive device 100, and is selected according to a determination of the failure of the second motor generator MG2. In the operation mode limp home A, the first motor generator MG1 is driven in the forward rotation direction, the second brake B2 is in the engaged state, and the first clutch TWC1, the third clutch TWC3, and the first brake B1 are in the disengaged state. The second clutch TWC2 is in the engaged state.

In this state, since the sun gear S2 of the second differential mechanism 2 is fixed by fastening the second brake B2, when the first motor generator MG1 is driven in the forward rotation direction, the carrier coupling body 6 rotates forward, and the rotational power in the forward direction is output from the axle OUT. At this time, the torque T output from the output shaft 4 is expressed by the following equation.

$$T=\{(\alpha+1+\beta)/(1+\beta)\} \times Tmg1$$

Figure 17:
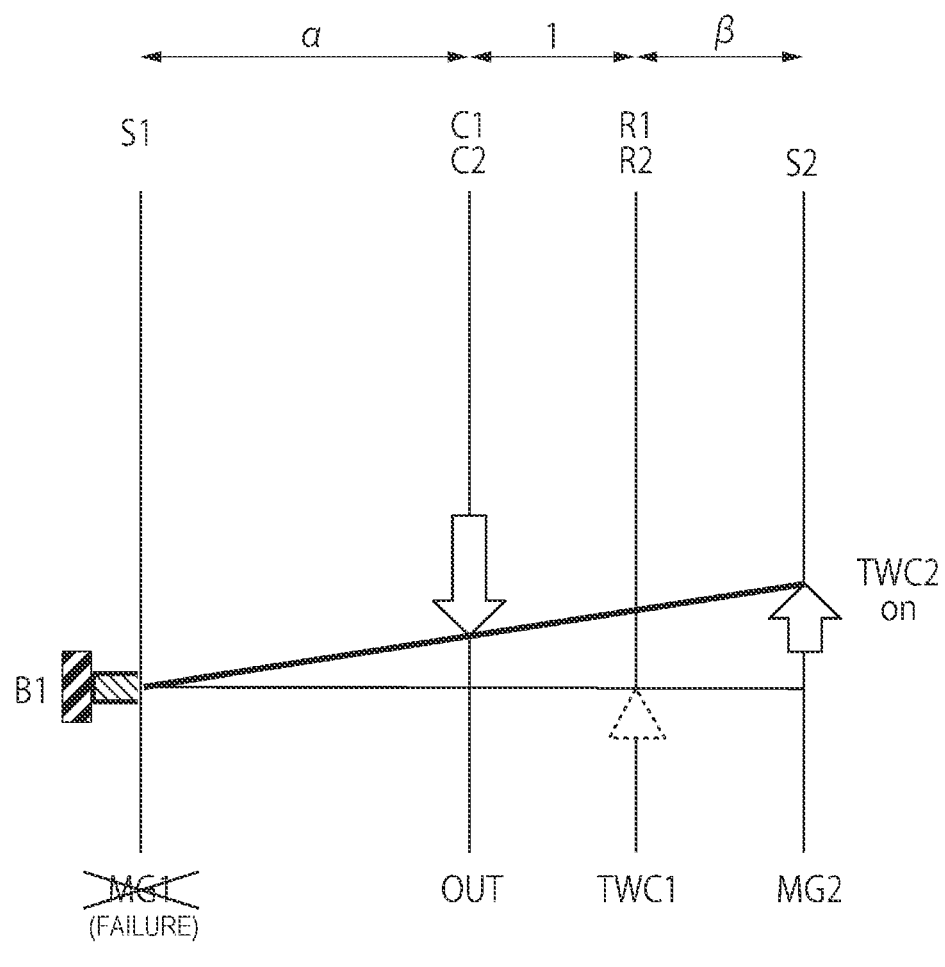
FIG. 17 is a collinear diagram illustrating an operation mode limp home B of the drive device in FIG. 1.

FIG. 17 is the collinear diagram illustrating the operation mode limp home B of the drive device 100, and is selected according to a determination of the failure of the first motor generator MG1. In the operation mode limp home B, the second motor generator MG2 is driven in the forward rotation direction, the first brake B1 is in the engaged state, and the first clutch TWC1, the third clutch TWC3, and the second brake B2 are in the disengaged state. The second clutch TWC2 is in the engaged state.

In this state, since the sun gear S1 of the first differential mechanism 1 is fixed by fastening the first brake B1, when the second motor generator MG2 is driven in the forward rotation direction, the carrier coupling body 6 rotates forward, and the rotational power in the forward direction is output from the axle OUT. At this time, the torque T output from the output shaft 4 is expressed by the following equation.

$$T=\{(\alpha+1+\beta)/\alpha\} \times Tmg2$$

Figure 18:
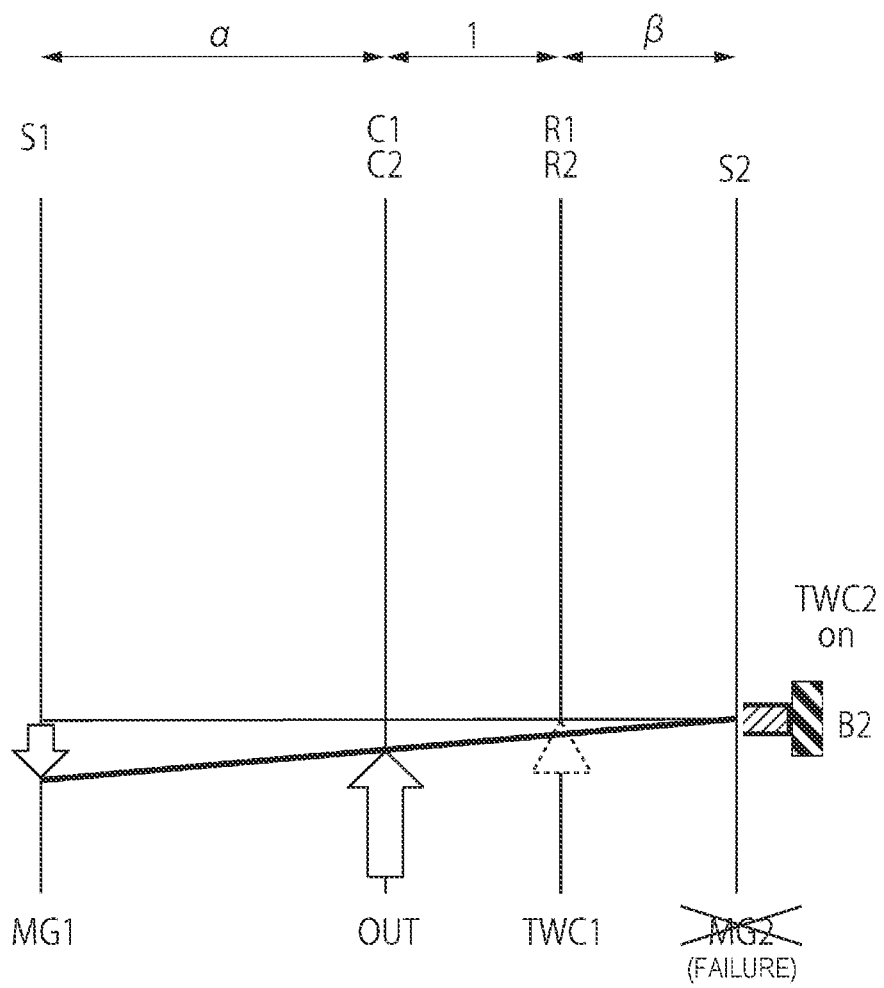
FIG. 18 is a collinear diagram illustrating an operation mode limp home A_Rev. of the drive device in FIG. 1.

FIG. 18 is the collinear diagram illustrating the operation mode limp home A_Rev. of the drive device 100, and is selected in the backward movement of the vehicle in the operation mode limp home A of FIG. 16 according to the determination of the failure of the second motor generator MG2. In the operation mode limp home A_Rev., the first motor generator MG1 is driven in the reverse rotation direction, the second brake B2 is in the engaged state, and the first clutch TWC1, the third clutch TWC3, and the first brake B1 are in the disengaged state. The second clutch TWC2 is in the engaged state.

In this state, since the sun gear S2 of the second differential mechanism 2 is fixed by fastening the second brake B2, when the first motor generator MG1 is driven in the reverse rotation direction, the carrier coupling body 6 rotates reversely, and the rotational power in the backward direction is output from the axle OUT. At this time, the torque T output from the output shaft 4 is expressed by the following equation.

$$T=\{(\alpha+1+\beta)/(1+\beta)\} \times Tmg1$$

Figure 19:
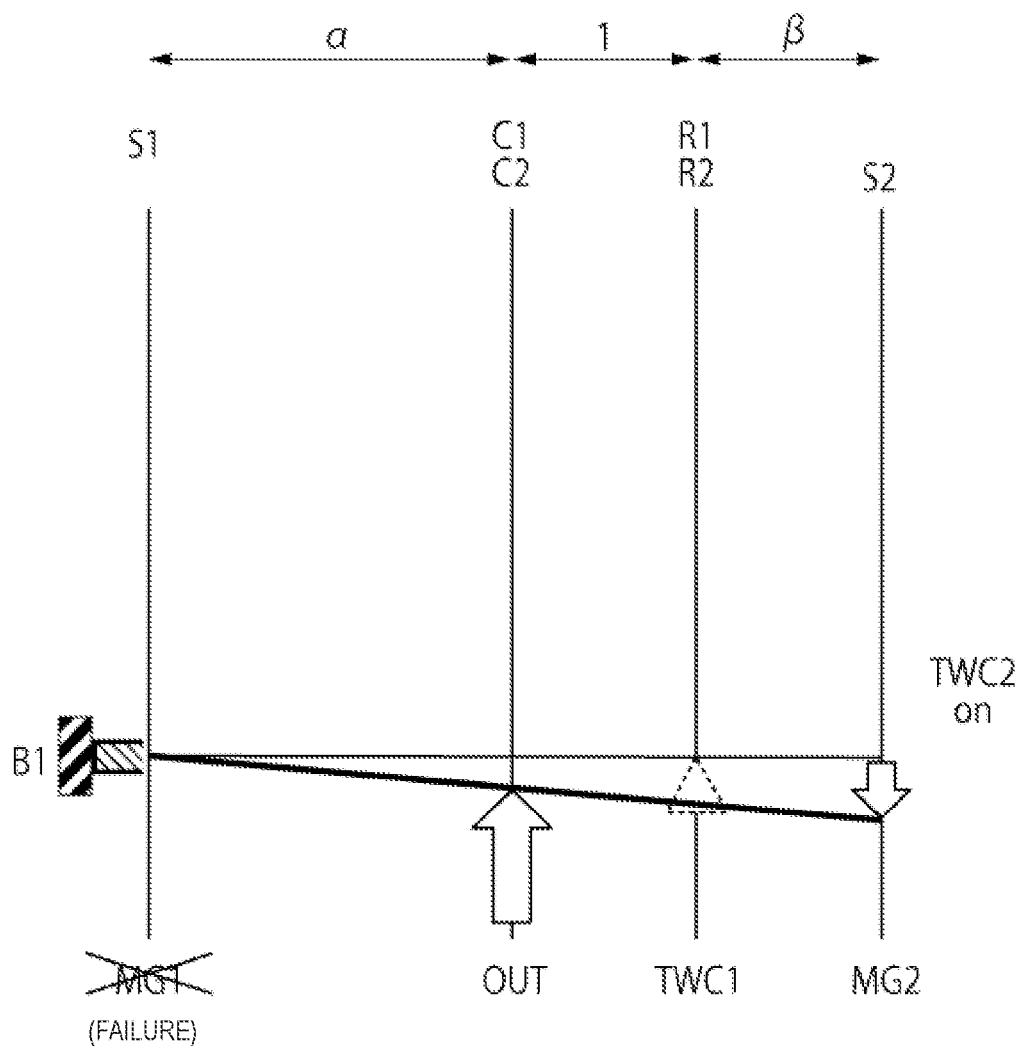
FIG. 19 is a collinear diagram illustrating an operation mode limp home B_Rev. of the drive device in FIG. 1.

FIG. 19 is the collinear diagram illustrating the operation mode limp home B_Rev. of the drive device 100, and is selected in the backward movement of the vehicle in the operation mode limp home B of FIG. 17 according to the determination of the failure of the first motor generator MG1. In the operation mode limp home B_Rev., the second motor generator MG2 is driven in the reverse rotation direction, the first brake B1 is in the engaged state, and the first clutch TWC1, the third clutch TWC3, and the second brake B2 are in the disengaged state. The second clutch TWC2 is in the engaged state.

In this state, since the sun gear S1 of the first differential mechanism 1 is fixed by fastening the first brake B1, when the second motor generator MG2 is driven in the reverse rotation direction, the carrier coupling body 6 rotates reversely, and the rotational power in the backward direction is output from the axle OUT. At this time, the torque T output from the output shaft 4 is expressed by the following equation.

$$T=\{(\alpha+1+\beta)/\alpha\} \times Tmg2$$

Although the embodiments are described above with reference to the drawings, it is needless to say that the present invention is not limited to such examples. It will be apparent to those skilled in the art that various changes and modifications may be conceived within the scope of the claims. It is also understood that the various changes and modifications belong to the technical scope of the present invention. Components in the embodiments described above may be combined freely within a range not departing from the spirit of the invention.

At least the following matters are described in the present description. Although the corresponding components or the like in the above embodiment are illustrated in parentheses, the present invention is not limited thereto.

(1) A drive device (the driving device 100) includes:
- a first electric motor (the first motor generator MG1);
- a second electric motor (the second motor generator MG2);
- a first differential mechanism (the first differential mechanism 1) capable of differentiating three rotating elements from each other;
- a second differential mechanism (the first differential mechanism 2) capable of differentiating three rotating elements from each other;
- an output shaft (the output shaft 4); and
- a first connection/disconnection portion (the first clutch TWC1) configured to allow rotation in a disengaged state and restrict rotation in an engaged state, in which
- the first electric motor is coupled to a first rotating element (the sun gear S1) of the first differential mechanism,
- the second electric motor is coupled to a first rotating element (the sun gear S2) of the second differential mechanism,
- a second rotating element (the carrier C1) of the first differential mechanism and a second rotating element (the carrier C2) of the second differential mechanism are coupled with each other to form a first rotating element coupling body (the carrier coupling body 6), and the first rotating element coupling body is coupled to the output shaft,
- a third rotating element (the ring gear R1) of the first differential mechanism and a third rotating element (the ring gear R1) of the second differential mechanism are coupled with each other to form a second rotating element coupling body (the ring gear coupling body 7), and the second rotating element coupling body is coupled to the first connection/disconnection portion, and the first rotating element of the first differential mechanism, the first rotating element coupling body, the second rotating element coupling body, the first rotating element of the second differential mechanism are aligned in this order on a collinear diagram.

According to (1), the two electric motors can be controlled such that a loss is minimized according to an operating condition, and outputs of the two motor can be combined and transmitted to the output shaft. For example, in a state in which the rotation of the second rotating element coupling body is restricted by the first connection/disconnection portion, since the outputs of the first motor and the second motor rotating in opposite directions can be combined and transmitted to the output shaft, by utilizing a low-speed rotation region (the high torque region) of the two electric motors, it is possible to improve an acceleration characteristic at the time of starting or towing a vehicle (2) The drive device according to (1) further includes:
a second connection/disconnection portion (the second clutch TWC2) configured to cut off power transmission in the disengaged state and allow the power transmission in the engaged state, in which
the second electric motor is coupled to the first rotating element of the second differential mechanism via the second connection/disconnection portion.

According to (2), by cutting off the power transmission between the second motor and the first rotating element of the second differential mechanism by the second connection/disconnection portion, a drive mode in which the output shaft is driven only by the output of the first electric motor can be realized.

(3) The drive device according to (1) or (2) further includes:
a third connection/disconnection portion (the second brake B2) configured of allow rotation in the disengaged state and restrict rotation in the engaged state, in which
the second electric motor or the first rotating element of the second differential mechanism is coupled to the third connection/disconnection portion.

According to (3), by making the second electric motor or the first rotating element of the second differential mechanism coupled to the second electric motor non-rotatable by the third connection/disconnection portion, a reverse rotation drive mode in which the output shaft is driven for reverse rotation only by the output of the first electric motor can be realized. Further, when a failure occurs in the second electric motor, the output shaft can be driven for forward rotation and reverse rotation only by the output of the first electric motor.

(4) The drive device according to any one of (1) to (3) further includes:
a fourth connection/disconnection portion (the first brake B1) configured to allow rotation in the disengaged state and restrict rotation in the engaged state, in which
the first electric motor or the first rotating element of the first differential mechanism is coupled to the fourth connection/disconnection portion.

According to (4), by making the first electric motor or the first rotating element of the first differential mechanism coupled to the first electric motor non-rotatable by the fourth connection/disconnection portion, the output shaft can be driven for forward rotation and reverse rotation only by the output of the second electric motor when a failure occurs in the first electric motor.

(5) The drive device according to any one of (1) to (4) further includes:
a fifth connection/disconnection portion (the third clutch TWC3) configured to allow differential rotation of the three rotating elements of the second differential mechanism in the disengaged state, and disable differential rotation of the three rotating elements of the second differential mechanism in the engaged state.

According to (5), each differential mechanism is locked up by the fifth connection/disconnection portion, and the differential rotation between the rotating elements in each differential mechanism becomes zero, so that a mechanical loss can be significantly reduced.

(6) The drive device according to any one of (1) to (5), in which
the first rotating element of the first differential mechanism is a sun gear,
the second rotating element of the first differential mechanism is a carrier,
the third rotating element of the first differential mechanism is a ring gear,
the first rotating element of the second differential mechanism is a sun gear,
the second rotating element of the second differential mechanism is a carrier, and
the third rotating element of the second differential mechanism is a ring gear.

According to (6), the drive device capable of reducing the mechanical loss can be realized by using a highly versatile planetary gear mechanism.

What is claimed is:
1. A drive device comprising:
a first electric motor;
a second electric motor;
a first differential mechanism capable of differentiating three rotating elements from each other, the first differential mechanism being a planetary gear mechanism that includes a sun gear, a ring gear provided concentrically with the sun gear, a pinion gear meshing with the sun gear and the ring gear, and a carrier rotatably and revolvably supporting the pinion gear;
a second differential mechanism capable of differentiating three rotating elements from each other, the second differential mechanism being a planetary gear mechanism that includes a sun gear, a ring gear provided concentrically with the sun gear, an inner pinion meshing with the sun gear, an outer pinion meshing with the inner pinion and the ring gear, and a carrier rotatably and revolvably supporting the inner pinion and the outer pinion;
an output shaft; and
a first connection/disconnection portion configured to allow rotation in a disengaged state and restrict rotation in an engaged state,
wherein a first rotating element and a second rotating element of the first differential mechanism are configured to rotate in a same direction when a third rotating element of the first differential mechanism is fixed,
wherein a first rotating element and a second rotating element of the second differential mechanism are configured to rotate in opposite directions with each other when a third rotating element of the first differential mechanism is fixed,
wherein the first electric motor is coupled to the first rotating element of the first differential mechanism,
wherein the second electric motor is coupled to the first rotating element of the second differential mechanism,
wherein the second rotating element of the first differential mechanism and the second rotating element of the second differential mechanism are coupled with each other to form a first rotating element coupling body, and the first rotating element coupling body is coupled to the output shaft, wherein the third rotating element of the first differential mechanism and the third rotating element of the second differential mechanism are coupled with each other to form a second rotating element coupling body, and the second rotating element coupling body is coupled to the first connection/disconnection portion, wherein the drive device further comprises:

a second connection/disconnection portion configured to cut off power transmission in the disengaged state and allow the power transmission in the engaged state; and a third connection/disconnection portion configured to allow rotation in the disengaged state and restrict rotation in the engaged state, wherein the second electric motor is coupled to the first rotating element of the second differential mechanism via the second connection/disconnection portion, wherein the second electric motor or the first rotating element of the second differential mechanism is coupled to the third connection/disconnection portion, wherein the first rotating element of the first differential mechanism is the sun gear, wherein the second rotating element of the first differential mechanism is the carrier, wherein the third rotating element of the first differential mechanism is the ring gear, wherein the first rotating element of the second differential mechanism is the sun gear, wherein the second rotating element of the second differential mechanism is the carrier, and wherein the third rotating element of the second differential mechanism is the ring gear.

2. The drive device according to claim 1 further comprising:

a fourth connection/disconnection portion configured to allow rotation in the disengaged state and restrict rotation in the engaged state, wherein the first electric motor or the first rotating element of the first differential mechanism is coupled to the fourth connection/disconnection portion.

3. The drive device according to claim 1 further comprising:

a fifth connection/disconnection portion configured to fasten two of the three rotating elements of the second differential mechanism to disable differential rotation of the three rotating elements of the second differential mechanism in the engaged state, and to break a fastening between the two of the three rotating elements of the second differential mechanism to allow differential rotation of the three rotating elements of the second differential mechanism in the disengaged state.

4. A drive device comprising:

a first electric motor;

a second electric motor;

a first differential mechanism capable of differentiating three rotating elements from each other, the first differential mechanism being a planetary gear mechanism that includes a sun gear, a ring gear provided concentrically with the sun gear, a pinion gear meshing with the sun gear and the ring gear, and a carrier rotatably and revolvably supporting the pinion gear;

a second differential mechanism capable of differentiating three rotating elements from each other, the second differential mechanism being a planetary gear mechanism that includes a sun gear, a ring gear provided concentrically with the sun gear, an inner pinion meshing with the sun gear, an outer pinion meshing with the inner pinion and the ring gear, and a carrier rotatably and revolvably supporting the inner pinion and the outer pinion;

an output shaft; and a first connection/disconnection portion configured to allow rotation in a disengaged state and restrict rotation in an engaged state, wherein a first rotating element and a second rotating element of the first differential mechanism are configured to rotate in a same direction when a third rotating element of the first differential mechanism is fixed, wherein a first rotating element and a second rotating element of the second differential mechanism are configured to rotate in opposite directions with each other when a third rotating element of the first differential mechanism is fixed, wherein the first electric motor is coupled to the first rotating element of the first differential mechanism, wherein the second electric motor is coupled to the first rotating element of the second differential mechanism, wherein the second rotating element of the first differential mechanism and the second rotating element of the second differential mechanism are coupled with each other to form a first rotating element coupling body, and the first rotating element coupling body is coupled to the output shaft, wherein the third rotating element of the first differential mechanism and the third rotating element of the second differential mechanism are coupled with each other to form a second rotating element coupling body, and the second rotating element coupling body is coupled to the first connection/disconnection portion, wherein the first rotating element of the first differential mechanism is the sun gear, wherein the second rotating element of the first differential mechanism is the carrier, wherein the third rotating element of the first differential mechanism is the ring gear, wherein the first rotating element of the second differential mechanism is the sun gear, wherein the second rotating element of the second differential mechanism is the carrier, and wherein the third rotating element of the second differential mechanism is the ring gear.

* * * * *